United States Patent [19]

Ozaki et al.

[11] 4,423,441

[45] Dec. 27, 1983

[54] PCM RECORD REPRODUCER

[75] Inventors: Minoru Ozaki, Amagasaki; Ken Onishi, Kohriyama; Kunimaro Tanaka, Amagasaki, all of Japan

[73] Assignee: Mitsubishi Denki Kabushiki Kaisha, Tokyo, Japan

[21] Appl. No.: 182,055

[22] Filed: Aug. 28, 1980

[30] Foreign Application Priority Data

Aug. 30, 1979 [JP] Japan ............................... 54-111193
Sep. 17, 1979 [JP] Japan ............................... 54-119525

[51] Int. Cl.³ .................... G11B 27/02; G11B 5/00
[52] U.S. Cl. ......................................... 360/13; 360/32
[58] Field of Search ............... 360/32, 13, 40; 371/39, 371/40

[56] References Cited

U.S. PATENT DOCUMENTS

| 3,050,105 | 8/1962 | Dolby ............................ | 360/13 |
| 4,063,284 | 12/1977 | Tarami .......................... | 360/36 |
| 4,143,406 | 3/1979 | Tsuiki et al. .................. | 360/48 |
| 4,146,099 | 3/1979 | Matsushima et al. ........ | 360/32 |
| 4,234,896 | 11/1980 | Onishi et al. ................. | 360/32 |
| 4,238,852 | 12/1980 | Iga et al. ...................... | 360/32 |
| 4,281,355 | 7/1981 | Wada et al. ................... | 360/32 |

OTHER PUBLICATIONS

"On Tape-Cut Editing with a Fixed Head Type PCM Tape Recorder" by K. Tanaka et al., IEEE Transactions, vol. ASSP-27, #6, 12/79.

"Toshiba's PCM Magnetic Recording & Reproducing Apparatus" by Nakamura et al., Hoso Gijutsu 1978-11, pp. 765-770.

Primary Examiner—Vincent P. Canney
Attorney, Agent, or Firm—Oblon, Fisher, Spivak, McClelland & Maier

[57] ABSTRACT

A PCM record reproducer comprises a coder circuit for forming PCM signals by adding error detection codes to data signals in a predetermined pattern; a splice detection circuit for determining a splice point of a magnetic tape by finding inconsistency of the detected result of said error detection code depending upon said PCM signals read-out from said magnetic tape in which said PCM signals are recorded; and an editing circuit for editing said PCM signals when the splice point is determined by said splice detector circuit.

6 Claims, 15 Drawing Figures

| | | | | | | | | |
|---|---|---|---|---|---|---|---|---|
| 1st TRACK | 1 | a | b1 | b7 | b13 | b37 | d | a |
| 2nd " | 2 | a | b2 | b8 | b14 | b38 | d | a |
| 3rd " | 3 | a | b3 | b9 | b15 | b39 | d | a |
| 4th " | 4 | d | b4 | b10 | b16 | b40 | d | a |
| 5th " | 5 | a | b5 | b11 | b17 | b41 | d | a |
| 6th " | 6 | a | b6 | b12 | b18 | b42 | d | a |
| 7th " | 7 | a | C(a7) | | | | d | a |
| 8th " | 8 | a | C(a8) | | | | d | a |

PCM RECORD REPRODUCER

BACKGROUND OF THE INVENTION

1. FIELD OF THE INVENTION

The present invention relates to a PCM record reproducer for reproducing a magnetic tape in which pulse code modulation signals (codified sound signal) are recorded. More particularly, it relates to an edition detecting process wherein data are edited in a magnetic tape.

2. DESCRIPTION OF THE PRIOR ART

Figures 1, 2:
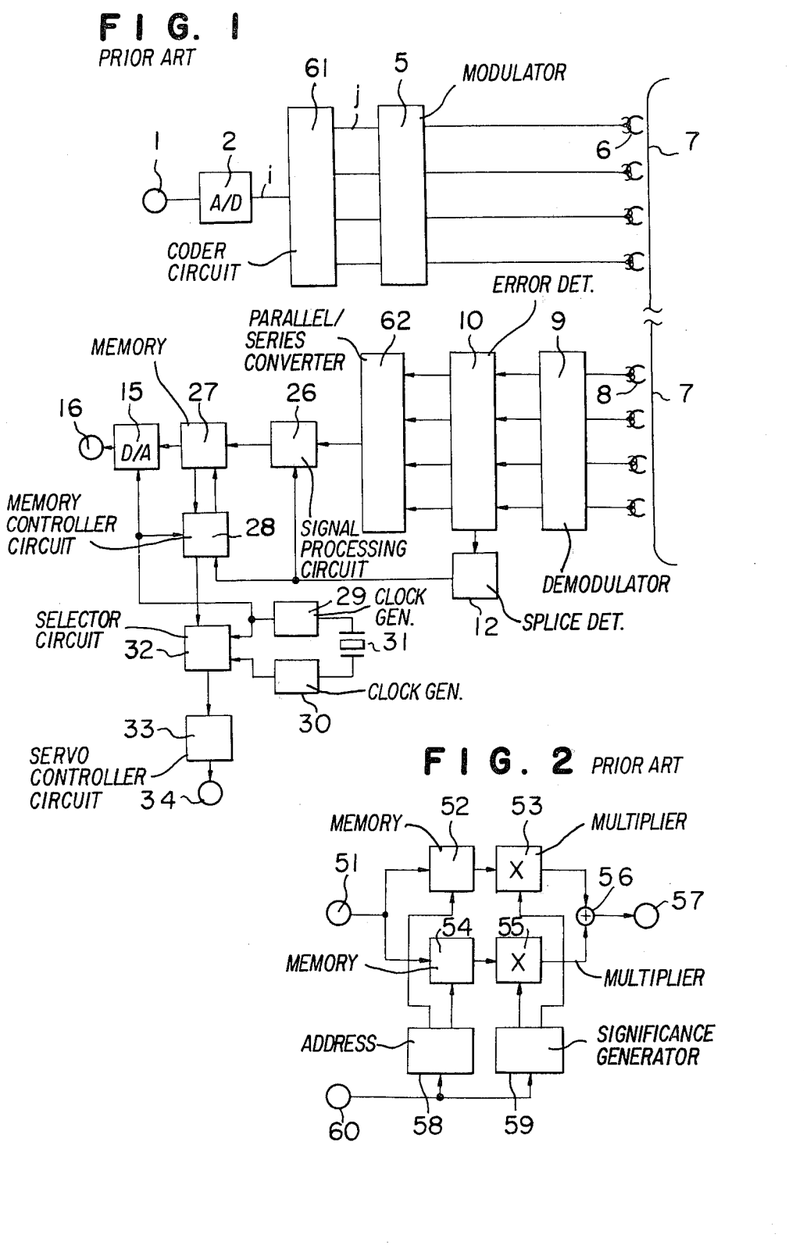
FIG. 1 shows a structure of the conventional PCM record reproducer.
FIG. 2 shows a block diagram of a signal processor circuit shown in FIG. 1.

FIG. 1 shows a conventional PCM record reproducer. In FIG. 1, the reference numeral (1) designate an analogue signal input terminal; (2) designates an analogue-digital converter; (61) designates a coder circuit for allotting PCM signal data given by the analogue-digital converter (2) into multi-tracks and adding each code for detecting error in each number of PCM signals in each track; (5) designates a modulator circuit for recording PCM signals in the magnetic tape; (6) designates a recording head; (7) designate the magnetic tape; (8) designates a reproducing head; (9) designates a demodulator circuit for demodulating the output reproduced by the reproducing head (8) into PCM signals; (10) designates a circuit for detecting error of the reproduced PCM signal; (12) designates a splice detector circuit for detecting the edited point (hereinafter referring to as splice point); (62) designates a parallel-serial converter circuit for arranging PCM signals in the multi-tracks into serial PCM signals having the same form as at the recording; (26) designates a signal processor circuit for connecting the PCM signals near the splice point without any level-jumping by the signal of the splice detector circuit (12); (27) designates a memory circuit and the timing for read-out and write-in of the memory is controlled by a memory controller circuit (28); (29), (30) respectively designate clock generator circuits for controlling the PCM record reproducer; (31) designates quartz; (32) designates a selector circuit for switching clocks from the clock generator circuits (29), (30) by the signal of the memory controller circuit (28); (33) designates a servo controller circuit for controlling the running of the magnetic tape depending upon the clock selected by the selector circuit (32); (34) designates an output terminal to the servo system; (15) designates a digital-analogue converter circuit; and (16) designates an output terminal of the analogue signal.

The operation will be illustrated.

In order to simplify the discussion, in FIG. 1 the number of the tracks is 4; and the number of frames of the PCM signals is 4.

The analogue signals input from the input terminal (1) are converted in PCM signals by the analogue-digital converter (2).

Figure 3:
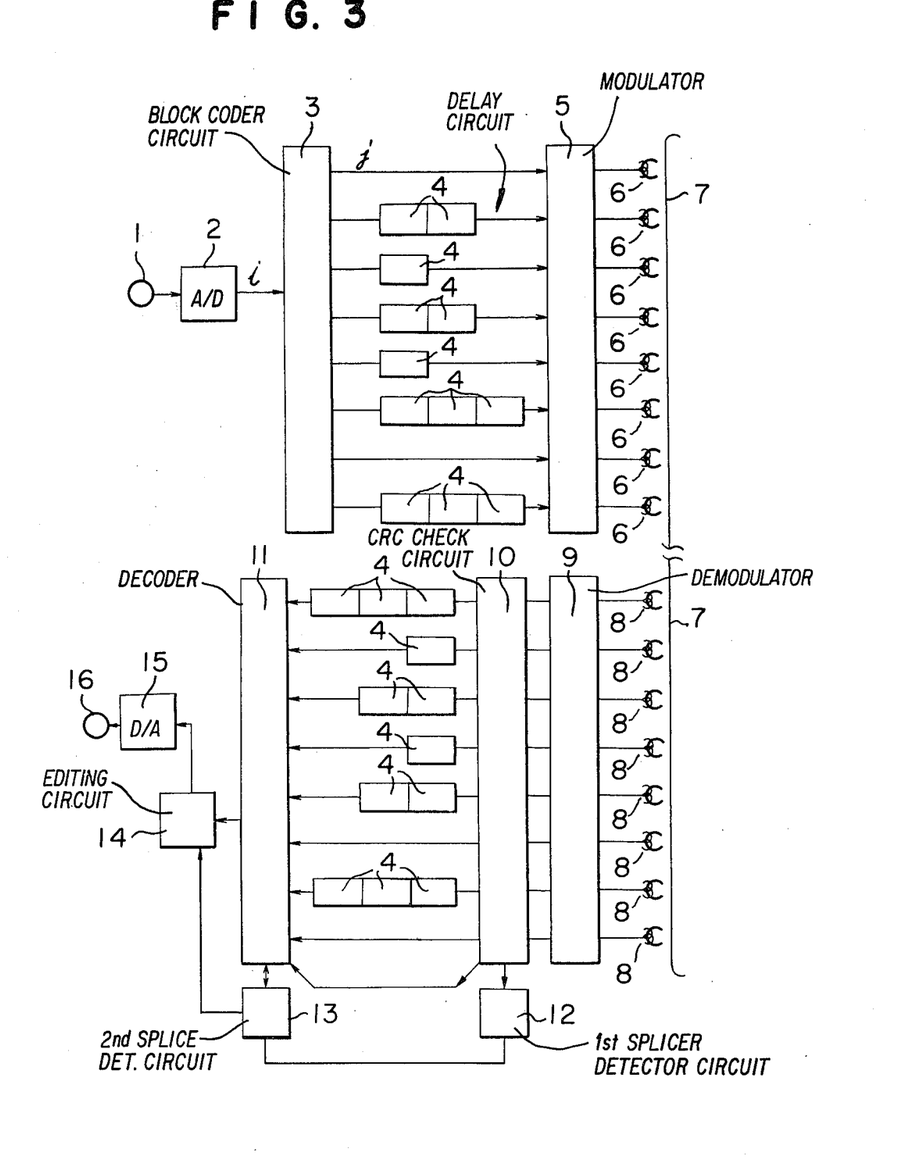
FIG. 3 shows a structure of one embodiment of the PCM record reproducer of the present invention.
Figures 9A, 9B:
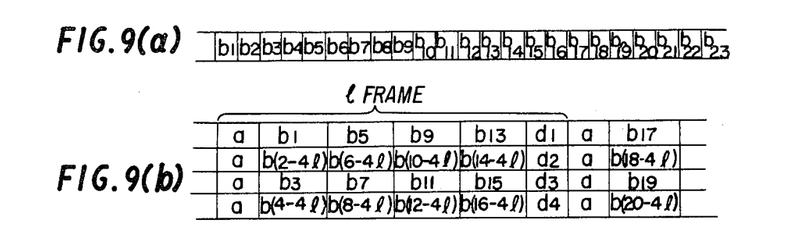
FIG. 9(a) shows a time chart of signals.
FIG. 9(b) shows product codes.

The PCM signals in the part (i) in FIG. 1 are converted into the data shown in FIG. 9(a) wherein the references (b$_1$), (b$_2$) ... show PCM signals arranged in time. The PCM signals are allotted to the tracks by the track allotting and error detecting coder (61); and the synchronous mark (a) is also added. The format of the output (j) in FIG. 3 is shown in FIG. 9(b) wherein the references (d$_1$), (d$_2$), (d$_3$), (d$_4$) designate error detection codes. The output of the coder circuit (61) is modulated for recording into the magnetic tape (7) by the modulator circuit (5) and recorded into the magnetic tape (7) by the recording head (6).

The reproduction will be illustrated.

The signals are read-out from the magnetic tape (7) by the reproducing head (8) and converted into the PCM signals by the demodulator circuit (9) and any error is detected by the error detector circuit (10) and the signals are converted by the parallel-serial converter circuit (62).

The operation for normal reproduction for a non-splice point will be illustrated.

Two PCM signals as the output of the parallel-serial converter circuit (62) are treated by the signal processor circuit (26) to collect data and delayed by the memory circuit (27). The PCM signals are converted into analogue signals by the digital-analogue converter (15) and fed out from the output terminal (16).

The operation for reproduction for the magnetic tape having a splice point will be illustrated.

When the splice point is detected by the splice detector circuit (12), the memory controller circuit (28) stops the write-in clock whereby the operation for write-in of the error data at the splice point in the memory circuit (27) is stopped. On the other hand, when the read-out from the memory circuit (27) for the error at the splice point is finished, the memory controller circuit (28) actuates the write-in clock of the memory circuit (27) thereby starting the write-in of the PCM signal for processing to connect smoothly the data in the front and back part of the splice point, into the memory circuit (27). Therefore, the error at the splice point is not written-in the memory circuit.

The memory quantity for the PCM signals in the memory circuit is reduced by the signal processing at the splice point and accordingly, it is necessary to fill PCM signals into the memory circuit.

The additional feed of the PCM signals for filling into the memory circuit (27) will be illustrated.

The memory quantity in the memory circuit (27) is always detected by the memory controller circuit (28). When the memory quantity in the memory circuit is reduced from a predetermined value by the processing at the splice point, the clock of the second clock generator circuit (30) is selected.

On the other hand, the clock of the first clock generator circuit (29) is used as the read-out clock of the memory circuit and the clock of the digital-analogue converter. The clock of the second clock generator (30) is slightly faster than the clock of the first clock generator circuit, whereby the tape running speed and the rate signal write-in in the memory circuit increases relative to the read-out rate of from the memory circuit to fill the memory quantity. When the memory quantity increases over a predetermined value, the memory control circuit (28) feeds the control signal to the selector circuit (32) so as to select the clock of the first clock generator circuit.

The operation of the signal processor circuit (26) will be illustrated.

In FIG. 2, the reference number (51) designates an input terminal for PCM signals; (52), (54) respectively designate first and second memories for potentially memorizing PCM signals; (58) designates an address circuit for controlling the write-in of the memories (52), (54); (53), (55) respectively designate multipliers; (59) designates a significance generator for generating coefficients for the multipliers (53), (55); (56) designates an adder; (57) designates an output and (60) designates an input terminal for the splice detecting signal.

In the non-splice detection, the signal processor circuit (26) usually operates such that the input signal passed through the first memory (52) is multiplied by a factor of one (×1) by the first multiplier circuit (53) and the input signal of the second memory (54) is multiplied by a factor of zero (×0) by the second multiplier (55) and the sum is given by the adder (54). The same signals as that of the input are thereby fed out from the output terminal (57).

The operation will be illustrated.

The address circuit (58) is operated by inputting the splice detecting signal from the terminal (60) to stop the write-in and read-out of the first memory (52). On the other hand, it is operated to continue the write-in of the second memory (54). When the splice signal is finished, the address circuit (58) is operated so as to start again the write-in and read-out of the first memory (52). At this moment, the memorized data in the second memory (52) are the PCM signals in the post-splice point. The output PCM signals of the first memory (52) fade-out by sequentially reducing the multiplying factor of the first multiplier (53) from ×1 to ×0. On the other hand, the output PCM signals of the second memory (54) fade-in by sequentially increasing from ×0 to ×1 the multiplying factor of the second multiplier (55). The control is carried out by the significance generator circuit (22).

The outputs of the multiplier circuits are added by the adder circuit (56) and the sum output from the output terminal (57).

The conventional PCM record reproducer has the above-mentioned structure and accordingly, it has been disadvantageously necessary to vary the tape running speed and to need two kinds of the clock generator circuits. It has been considered to record PCM signals on a magnetic tape by delaying one of the signals in multiple state during editing to prevent an error at a splice point so as to connect the data in the pre-splice point and the post-splice point. This operation, however, disadvantageously requires high record density in the magnetic tape.

SUMMARY OF THE INVENTION

The present invention is to overcome the above-mentioned disadvantage to vary a tape running speed or to need two kinds of clock generator circuits for double write-in.

The present invention is to provide a PCM record reproducer which comprises respective different delay circuits in each of tracks in which PCM signals are allotted and recorded thereby editing with both data in the pre-splice point and data in the post-splice point near a splice point for a predetermined period.

The present invention is also to provide a PCM record reproducer which comprises a splice detector circuit which determines a splice point of a magnetic tape in which PCM signals are recorded, by finding inconsistency between two or more error detection codes in the reproduction of the PCM signals with two or more error detection codes.

DETAILED DESCRIPTION OF THE PREFERRED EMBODIMENTS

Referring to the drawings, one embodiment of the present invention will be illustrated.

FIG. 3 shows a block diagram of the PCM record reproducer wherein the reference numeral (1) designates the analogue signal input terminal; (2) designates the analogue-digital converter; (3) designates the block coder circuit; (4) designates a delay circuit; (5) designates the modulator circuit for recording the PCM signal in the magnetic tape; (6) designates the multi-channel recording head; (7) designates the magnetic tape; (8) designates the multi-channel reproducing head; (9) designates the demodulator circuit for demodulating the output reproduced by the reproducing head, into the PCM signals; (10) designates the CRC check circuit; (11) designates a decoder circuit for decoding codes in the vertical direction; (12) designates a first splice detector circuit; (13) designates a second splice detector circuit; (14) designates an editing circuit; (15) designates the digital-analogue converter; and (16) designates the analogue output terminal.

Figure 4A:
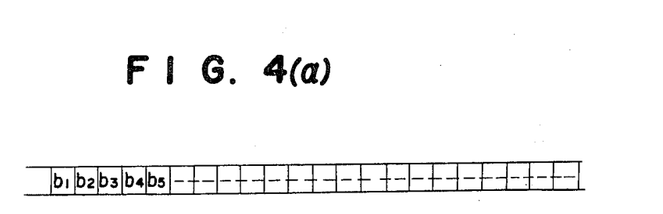
FIG. 4(a) shows a time chart of signals.
Figure 4B:
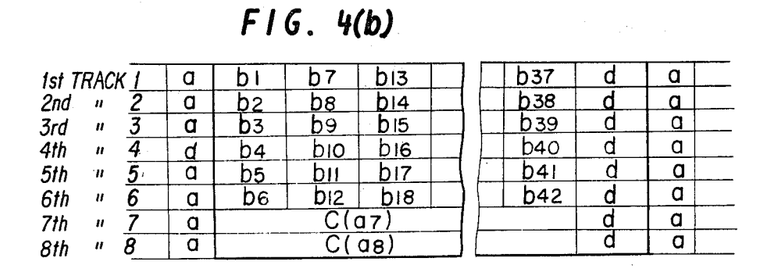
FIG. 4(b) shows product codes.

FIG. 4(a) shows the input data of the block coder circuit (3) shown in FIG. 3; and FIG. 4(b) shows the output (j) of the block coder circuit wherein (a) designates a synchronous mark; ($b_1$) ($b_2$) . . . designate the PCM signals of one sample; (d) designates an error detection code for the data in the tracks; and ($a_7$), ($a_8$) designate error detection codes in the track direction (referring to as longitudinal direction).

The error correction codes used in the present invention will be illustrated.

In this embodiment, the magnetic tape having 8 tracks is considered.

The block is formed by the combination of linear code (8, 6) (referring to as code c) on GF ($2^4$) as the code in the track direction and linear code (240, 224) (referring to as code d) on GF (2) as the code in the tape running direction (referring to as transversal direction). In the description, (n, k) code means a code having a length of n and a symbol number of k; and GF (2) has two elements 0 and 1 and GF ($2^4$) has 16 elements.

The code d can be CRC code having 16 bits of check bits (burst error detection code).

The polynominal is given by the equation:

$$G(X) = X^{16} + X^{12} + X + 1 \pmod{2} \quad (1)$$

The code c can be Read-Solomon code on GF ($2^4$).

The parity detection data of the code c $a_7$, $a_8$ are given by the equations:

$$a_7 = \sum_{i=1}^{6} a_i \alpha_i$$

$$a_8 = \sum_{i=1}^{7} a_i$$

wherein $\alpha$ i(i=1−6) is $2^3$ elements.

The block codes of the combination of the code c and the code d have the following functions for connection.

(A) It detects no error in the code c and the code d when no error track is found.

(B) It detects the track having an error in the code c to correct the error and it detects the track having an error in the code d, when one track error is found.

(C) Both errors in the two tracks are corrected depending upon the data of the tracks having the error in the code d and the code c when two track errors are found.

(D) The PCM signals in the tracks having the error in the code d are corrected when three or more track errors are found. The code c has not the function for correction.

The operation of the embodiment of the present invention shown in FIG. 3 will be illustrated.

The signals input from the analogue input terminal (1) are converted into the PCM signals by the analogue-digital converter (2), and the block codes are input into the coder circuit (3). The block coder circuit (3) forms the block codes having the codes c in the longitudinal direction and the codes d in the transversal direction. Each synchronous signal (a) is added to each track. The output of the block coder circuit (3) is shown in FIG. 4(b). The delay circuit (4) is a circuit for delaying for 1 frames. In the first and seventh tracks, no delay is made. In the third and fifth tracks, it delays for 1 frames. In the second and fourth tracks, it delays for 21 frames. In the sixth and eighth tracks, it delays for 31 frames. The signals are input into the modulator circuit (5) wherein the PCM signals are modulated and are recorded in the magnetic tape (7) by the recording head (6).

Figure 5:
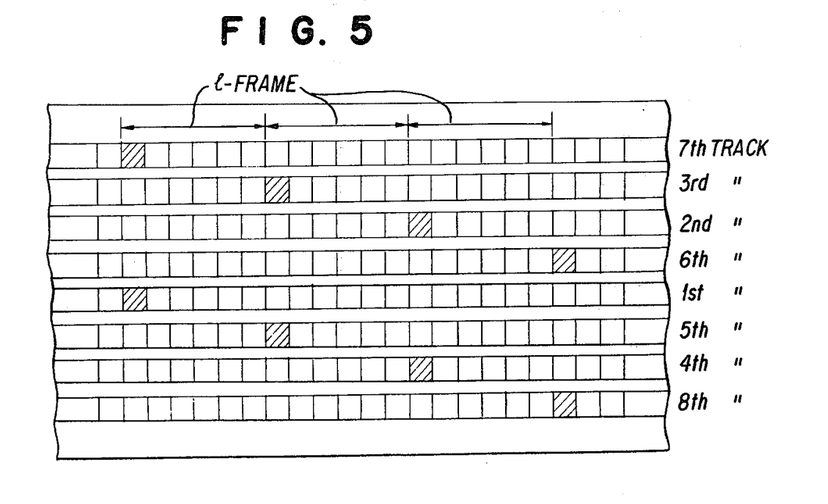
FIG. 5 shows a magnetic tape format.

FIG. 5 shows the magnetic tape record format wherein the block codes are formed by the hatched frames. This result can be obtained by recording with different delays in each track.

The recorded signals in the magnetic tape (7) shown in FIG. 5 are reproduced by the reproducing head (8) and the signals are converted into the PCM signals by the demodulator circuit (9). The PCM signals are synchronized by detecting the synchronous mark (a) and the error in frames in the tracks is checked by the CRC check circuit (10).

The first splice detector circuit (12) outputs the first splice detection signal when the CRC check circuit (10) detects that errors in the frames are found in all tracks at the same time. The PCM signals passed through the CRC check circuit (10) are delayed in the delay circuit (4) for 31 frames in the first and seventh tracks; for 21 frames in the second and fourth tracks; for 1 frame in the third and fifth tracks. In the sixth and eighth tracks, the PCM signals are input into the decoder circuit (11) without delay. Thus, the inputs in the 8 tracks are returned to the original block codes. In the decoder circuit (11), the error PCM data in the code c are corrected to output the PCM signals into the editing circuit (14). When there is inconsistency between the CRC check detection and the error data in the code c, the second splice detection signal is output from the second splice detector circuit (13).

The operation of the second splice detector circuit (13) will be illustrated in detail.

The second splice detection signal is output in the following condition.

(A) The result of the detection of the code d in a block unit shows non-error in all tracks, but the detection of the code c shows an error in the block unit.

(B) The result of the detection of the code d in a block unit shows an error only in the k track, but the detection of the code c shows an error in another track beside the k track.

Figure 6:
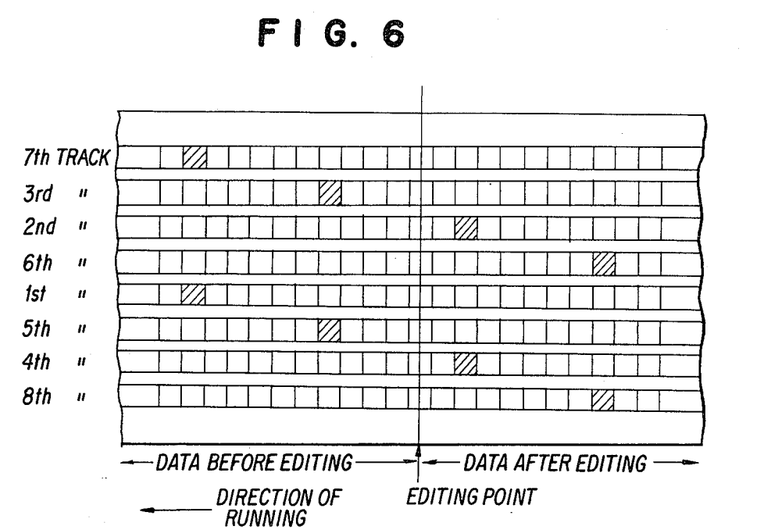
FIG. 6 shows a magnetic tape format near a splice point.

The condition (A) or (B) is found when an erroneous overlook is made by the CRC check circuit (10) or the recorded data in the frames of the block unit are different from the reproduced data in the frames of the block unit. The latter is found in the case of the splice point shown in FIG. 6. The block unit of the 8 hatched frames is formed by unrelated frames as a mixture of the data frames prior to the splice point and the data frames after the splice point.

The second splice detection signal is output after the erroneous overlook by the CRC check circuit (10) when the splice point is placed.

When the second splice detection signal is output by the splice point, frame errors in all tracks are present just before the output, and accordingly, such output may be given only during the specific period after the output of the first splice detection signal.

When the second splice detection signal is output during the period T after the output of the first splice detection signal, it is considered to be the splice point and the editing is carried out by the editing circuit (14). The signals obtained by the editing are input into the digital-analogue converter (15) to form the analogue signals and the analogue signals are output from the output terminal (16).

Figure 7:
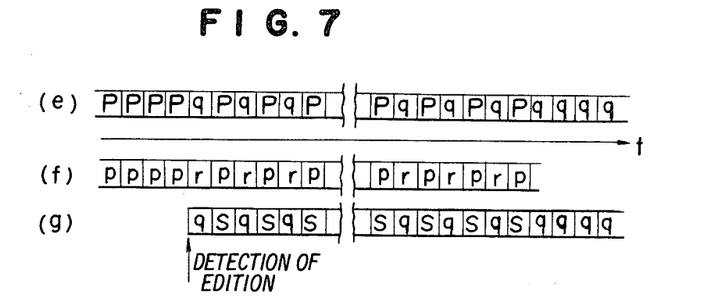
FIG. 7 shows a time chart of signals in an editing circuit.

When it is considered to be the splice point, the input PCM signal train in the editing circuit is given by using the delay circuits, whereby the PCM signal (p) in the pre-splice point and the PCM signal (q) in the post-splice point are alternately given as shown in FIG. 7(e).

The operation of the editing circuit will be illustrated in detail.

Figure 8:
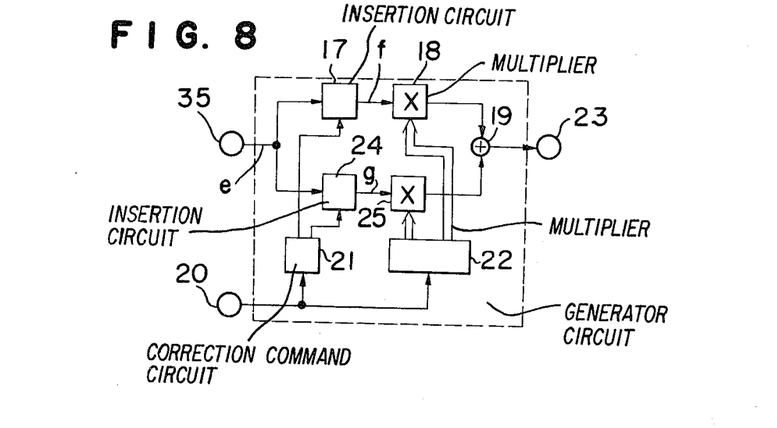
FIG. 8 shows a block diagram of the editing circuit.

In FIG. 8, the reference numeral (35) designates an input terminal; (17), (24) designate insertion circuits; (18), (25) designate multiplier circuits; (19) designates an adder circuit; (20) designates an input terminal for the splice detection signal; (21) designates a correction command circuit; (22) designate a significance generator circuit; and (23) designates an output terminal.

When any splice detection signal is not input into the editing circuit (14), the signals are passed through the first correction circuits (17), (24) and are multiplied by a factor of one ($\times 1$) by the first multiplier circuit (18) and added to the output of the multiplier (25) which multiplies by a factor of zero ($\times 0$) in the adder circuit (25) and the signals are output from the output terminal (23).

When the splice detection signals are input from the terminal (20), the PCM signals input from the input terminal (35) into the first insertion circuit (17), and the PCM signals (q) are substituted by the correction PCM signals (r) formed by the PCM signal (p) in the pre-splice point by the correction command circuit (21). The output of the first insertion circuit (17) forms the PCM signal train shown in FIG. 7(f) wherein the references r and s designate inserted PCM signals. On the other hand, the PCM signals input into the second insertion circuit (24), and the PCM signals (p) are substituted by the correction PCM signals (s) formed by the PCM signals (q) in the post-splice point by the insertion signals generated by the correction command circuit (21). The output of the second insertion circuit forms the PCM signal train shown in FIG. 7(g). The signal train (f) has only data in the pre-splice point and the signal train (g) has only data in the post-splice point.

The significance is given by the significance generator circuit (22) to multiple the PCM signal train (f) from ×1 to ×0 by the first multiplier circuit and to multiple the PCM signal train (g) from ×0 to ×1 by the second multiplier circuit. The outputs of the two multiplier circuits are summed by the adder circuit (19) to output from the editing circuit (14). The signals in the pre-splice point and the post-splice point are smoothly connected by the fade-in and the fade-out.

In the above-mentioned embodiment, the first splice detector circuit outputs the first splice detection signal only when all the tracks have errors in their frames. It is possible to output the first splice detection signal when more than a predetermined number of the tracks have errors in their frames.

In accordance with the present invention, the PCM signals are allotted into the tracks to form block codes, and are delayed in the tracks and recorded in the PCM magnetic tape, and the reproducer comprises the first splice detector circuit for detecting the splice point depending upon distribution of errors at the splice point and the second splice detector circuit for detecting the splice point by detecting two kinds of block codes in the longitudinal direction and in the transversal direction. Therefore, the splice point detection can be performed without failure. When the magnetic tape edited by hand cut edition is used, the edition processing is not performed since the splice detection is not made by the second splice detector circuit.

When the magnetic tape is reused, it is equivalent to a tape having a large defect perpendicular to the longitudinal direction, however, different delays are given for the block codes in the different tracks. In accordance with the present invention, only two tracks have errors in the block codes at the same time and accordingly, the errors can be corrected and the analogue signals can be reproduced without any trouble.

In the CRC check, generally, a misdetection or failing to detect errors included in the codes occurs at a certain probability. For example, misdetection occurs with a probability of about $2^{-16}$ in the CRC code prepared by polynominal expression $(X^{16}+X^{12}+X^5+1)$. On the other hand, the Read-Solomon code added in the track or width direction of a magnetic tape can detect errors in that case.

Accordingly, even when a part not including splice points is reproduced, inconsistency in the results of detecting using two codes (CRC and Read-Solomon codes) occurs at a low probability. For example, suppose the second splice detection circuit erroneously detects a splice point. In this event, the first splice detection circuit for detecting a distribution of errors in the CRC does not detect or indicate the splice point (because of no concentration of error caused by a splice point in a spliced part) whereby it is not determined to be the detection of a splice point and reproduction is carried out without any trouble by a normal decoding operation.

The precise detection of the splice point is attained by the two splice detector circuits.

The signals of a different number of frames in different tracks are delayed whereby the PCM signal in the pre-splice point and the PCM signal in the post-splice point near the splice point can be formed by utilizing these corrections. Thus, the data in the pre-splice point can be gradually decreased and the data in the post-splice point can be gradually increased by cross fading whereby the level jumping of the reproduced sound signals can be prevented.

Figure 12:
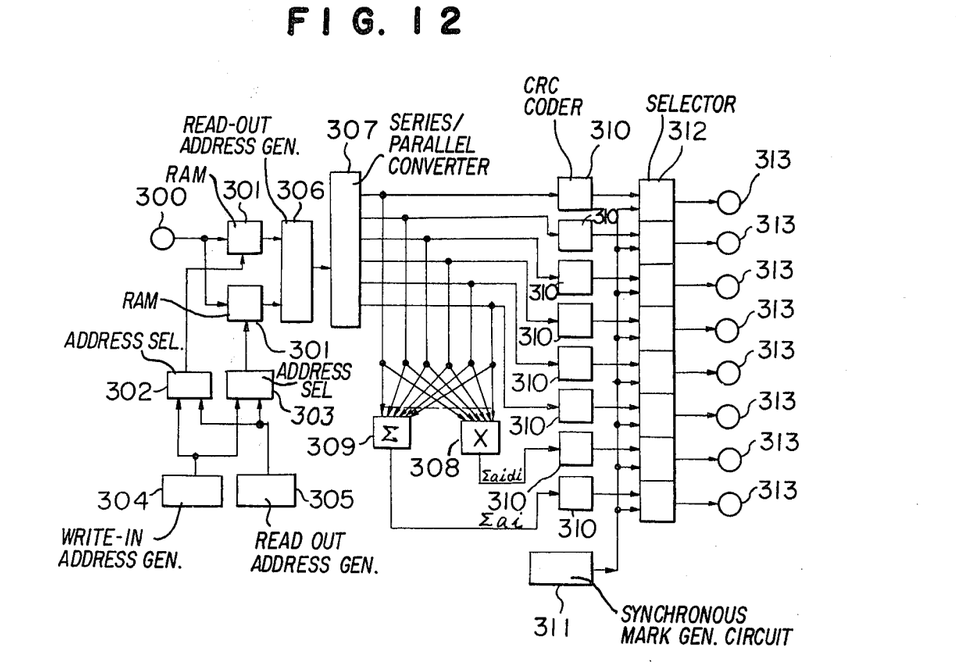
FIG. 12 shows the structure of block coder circuit (3) shown in FIG. 3.
Figure 13:
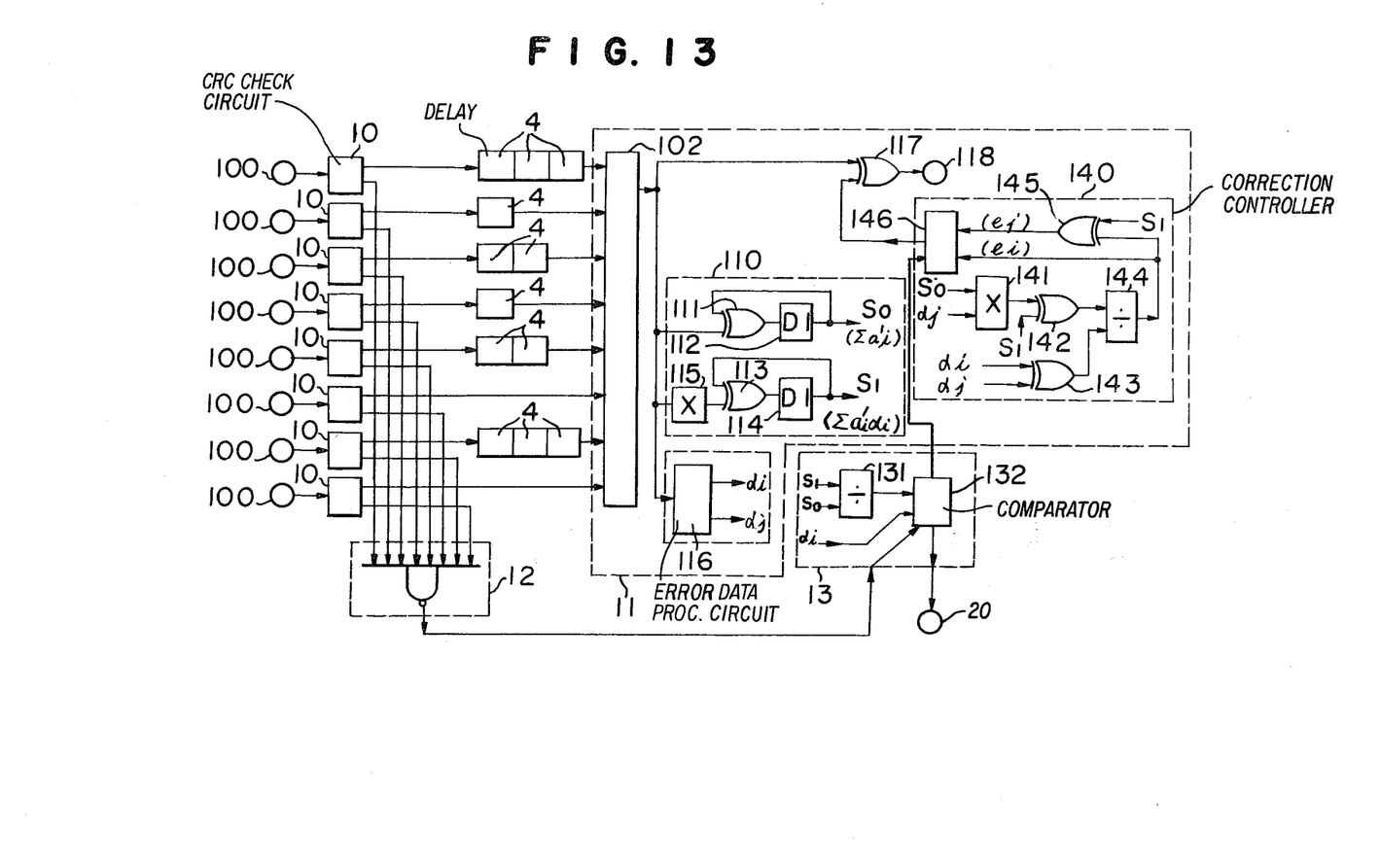
FIG. 13 shows the circuit of the first and second splice detector circuit (12), (13), the CRC check circuit (10) and the decoder circuit (11).

Referring to FIGS. 12 and 13, the block coder circuit (3), the first and second splice detector circuits (12), (13), the CRC check circuit (10) and the decoder circuit (11) will be further illustrated.

In FIGS. 12 and 13, the reference numerals (300) designates an input terminal of the PCM signals converted by the analogue-digital converter; (301) designates a RAM for allotting the PCM signals to the tracks; (302), (303) respectively designate the address-selectors; (304) designates a write-in address generating part in the RAM (301); (305) designates a read-out address generating part of the RAM(301); (306) designates a selector for selecting the output signal of the RAM in the read-out cycle side of the RAM (301); and (307) designates a serial-parallel converter for allotting the outputs of the selector (306) to the tracks. The outputs are PCM signals after allotting to the tracks. The reference numerals (308), (309) respectively designate arithmetic units; (310) designates a CRC coder circuit for coding codes in the transversal direction; (311) designates a synchronous mark generator circuit; (312) designates a selector for adding the synchronous marks in the signal trains; and (313) designates an output terminal of the block coder circuit; (100) designates an input terminal of the reproduced PCM signals of the decoder circuit (9); (101) designates a CRC check circuit; (12) designates the first splice detector circuit; (102) designates a parallel-serial converter circuit for multi-processing of the PCM signals allotted in the tracks in timing; (110) designates an error data processor circuit for the code in the vertical direction; (111), (113) respectively designate adder circuits for modulus 2 addition; (112), (114) respectively designate potential memory circuits; (115) designates a multiplier circuit for multiplying by GF($2^4$); (116) designates an error data processor circuit for the code in the transversal direction; (130) designates a second splice detector circuit for confirming coincidence of data detected by the error data processor circuit (110) for codes in the vertical direction and data detected by the error data processor circuit (110) for codes in the transversal direction; (131) designates a divider circuit for dividing by GF ($2^4$); (132) designates a comparator circuit; (119) designates an output terminal for the splice detection signal; (140) designates a block code error computer circuit; (141) designates a multiplier circuit for multiplying by GF ($2^4$); (142), (143), (145) respectively designate adders for modulus 2 addition; (144) designates a divider circuit for dividing by GF ($2^4$); (146) designates a correction controller circuit; (117) designates an adder circuit for modulus 2 addition; and (118) designates an output terminal of the decoder circuit (11).

Referring to FIG. 12, the block coder circuit (3) will be illustrated in detail.

The PCM signals converted by the analogue-digital converter are written-in the RAM (301), the PCM signals for samples in one block such as 42 samples in the embodiment of FIG. 4, for the address of the write-in address generating part (304) pursuant to a suitable rule. Two RAM's (301) are provided and controlled so that when one RAM is in the write-in cycle, the other RAM is in the read-out cycle. The function is changed for each write-in of 42 samples. The rule for read-out is controlled by the read-out address generating part (305) to read-out the PCM signals arranged in FIG. 4(b). The outputs of the selector (306) for selecting the read-out side of the RAM (301) are allotted to the tracks by the serial-parallel converter (307). The PCM signals allotted to the six tracks are operated by the arithmetic units (308), (309) in the equations (2), (3) to form the codes in the vertical direction. The codes in the transversal direction are added to the tracks by the CRC coder circuit (310) to form block codes. The synchronous mark (a) is formed by the synchronous mark generator circuit (311) and the selector (312) is controlled to add the synchronous mark in the position shown in FIG. 4(b).

The output of the block coder circuit (3) is shown in FIG. 4(b).

Referring to FIG. 13, the operation of the first and second splice detector circuits (12), (13), the CRC check circuit (10) and the decoder circuit (11) will be illustrated in detail.

In the decoder circuit (11), the data in the tracks are converted into one signal train by the parallel-serial converter (102) and $S_0$ and $S_1$ as error data are counted by the error data sampling circuit (110) for codes in the vertical direction. The references $S_0$ and $S_1$ are given by the following equations:

$$S_0 = \sum_{i=1}^{8} a'_i \quad (4)$$

$$S_1 = \sum_{i=1}^{7} a'_i \alpha^i \quad (5)$$

wherein $a_i'$ is a symbol for dividing the reproduced data in the tracks for each 4 bits.

If there is an error in the i th track, the following equations are given:

$$S_0 = ei \quad (6)$$

$$S_1 = ei\alpha i \quad (7)$$

wherein $a_i' = ai + ei$.

The conditions of $\sum_{i=1}^{8} ai = 0$ and $\sum_{i=1}^{7} ai\alpha i = 0$ are used.

The value $\alpha i$ can be given by the error data processor circuit (116) since the error track is known by the CRC check circuit (10). The value ei is given by operating from $S_0$, $S_i$ and $\alpha i$ by the block code error computer circuit (140) and ei is output and corrected by the correction controller circuit (146) when $a_i'$ is input into the adder circuit (117). In usual, the output of the correction controller circuit (146) is "0" when no error is found. In the description, an error in one track has been discussed. The correction can be made for errors in two tracks. The track with an error can be detected by the codes in the vertical direction by calculating $S_1/S_0$ under the equations (6), (7) in the decoding step. When the detected result is not inconsistent with the detected result of the error data processor circuit (116) for codes in the transversal direction, the second splice detector circuit (13) outputs the splice detection signal 20. The output signal of the first splice detector circuit (12) is input into the splice detector circuit (13) in which presence or absence of the splice point is judged by the comparator (132) and the result of the judgement is used as a control signal for the editing circuit (14).

The above-mentioned operation can be repeated for several times to obtain a plurality of splice detection signals to improve the reliability. The circuit can be formed by the combination of the comparator circuit (132) and a counter.

In these embodiments, the first and second splice detector circuits (12), (13) are used. It is also possible to simplify the circuit by using only the first splice detector circuit (12) to detect the splice point. Such embodiment will be illustrated.

The other embodiment of the present invention will be illustrated.

Figure 10:
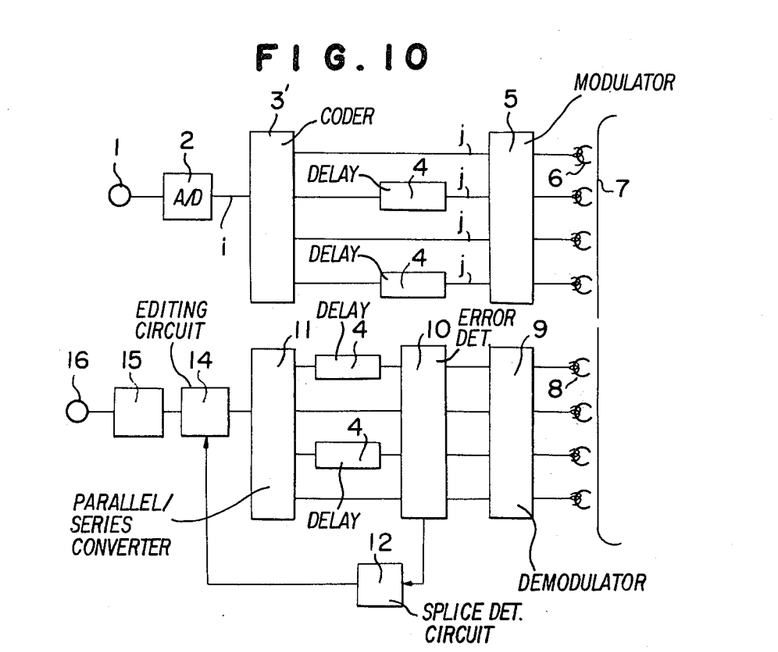
FIG. 10 shows a block diagram of another embodiment of the PCM record reproducer of the present invention.

FIG. 10 shows the block diagram of the PCM record reproducer of the present invention, wherein the reference numeral (1) designates an analogue signal input terminal; (2) designates an analogue-digital converter; (3') designates a coder circuit which allots data in the form of PCM signals into multi-tracks and add codes for error detection to the PCM signals in the tracks each predetermined number of the data; (4) designates a delay circuit for delaying signals in each track for a predetermined number of frames l; (5) designates a modulator circuit for recording the PCM signals in the magnetic tape; (6) designates a recording head; (7) designates a magnetic tape; (8) designates a reproducing head; (9) designates a demodulator circuit for demodulating the output reproduced by the reproducing head (8) into the PCM signals; (10) designates an error detector circuit for the reproduced PCM signals; (12) designates a splice detector circuit in which the result of detection of the error detection circuit (10) is input; (11) designates a parallel-serial converter circuit for converting the PCM signal in the multi-tracks into a time chart PCM signal train at the recording time; (14) designates an editing circuit for processing depending upon the detected output of the splice detector circuit (12); (15) designates a digital-analogue converter circuit; and (16) designates an analogue signal output terminal.

FIG. 9(a) shows the signal (i) and FIG. 9(b) shows the signal (j). The reference (a) designates a synchronous mark; $(b_1), (b_2), (b_3) \ldots$ designate PCM signals for one sample which are arranged in time chart; and $(d_1), (d_2), (d_3), (d_4)$ respectively designate error detection codes in the tracks.

In order to simplify the discussion, the number of tracks considered is 4; and the number of the frames of the PCM signals is 4.

The operation of the embodiment shown in FIG. 10 will be illustrated.

The analogue signals input from the input terminal (1) are converted into the PCM signals by the analogue-digital converter (2) to give the data shown in FIG. 9(a). The PCM signals are allotted into the tracks by the coder circuit for allotting to tracks, and detecting error (3'), and the error detection codes (CRCC) (contracted recycling code) are added and the synchronous marks (a) are added.

The signals in the second and fourth tracks are delayed by the delay circuit (4) for 1 frames and are input into the modulator circuit (5). The input is arranged as shown in FIG. 9(b). The output of the modulator circuit (5) is recorded in the magnetic tape (7) by the recording head for multi-channels.

The operation for edition will be illustrated.

One is a hand cut editing for connecting magnetic tapes by a splicing tape. Two kinds of editing can be considered for the PCM signals. In the case of the PCM record reproduction, it is necessary to cut the tape perpendicular to the longitudinal direction of the tape.

Figure 11:
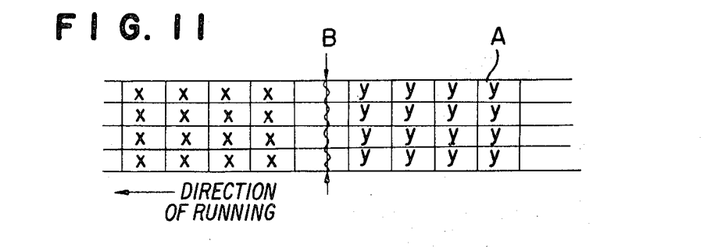
FIG. 11 shows a magnetic tape format at a splice point.

The other is an electronic editing for sequentially recording the data of the magnetic tapes in a master magnetic tape. The tape format at the splice point in both editings is shown in FIG. 11, wherein x designates frames for the PCM signal in the pre-splice point and y designates frames for the PCM signal in the post-splice point.

The operation for reproducing the recorded magnetic tape will be illustrated.

The data in the magnetic tape (7) are read-out by the reproducing head (8) to output the PCM signals having 4 tracks by the demodulator circuit (9). The frame is detected by the synchronous mark (a) in the error detector circuit (10) to perform the CRC check.

The signals in the first and third tracks are delayed by the delay circuit (4) for 1 frames to return the signals in the form of the original two element blocks. The signals are converted into one PCM signal train in the time chart by the parallel-serial converter circuit (11). The PCM signals in the frames having error found by the CRC check are corrected by the insertion processing. On the other hand, the splice detector circuit monitors the condition of error in the frames in the tracks detected by the error detector circuit (10). When errors are found in all the tracks at the same time, the splice point detection signal is fed into the editing circuit.

The editing circuit (14) is the same as the editing circuit (12) in the first embodiment and accordingly, the description for the editing circuit (14) is not repeated. The various modifications can be considered as those of the first embodiment.

In accordance with the present invention, the PCM signals are allotted into tracks and are delayed in the tracks and recorded in the PCM magnetic tape, and the splice point can be detected depending upon distribution of errors at the splice point of the magnetic tape having multi-tracks.

In accordance with the present invention, the PCM signals in the pre-splice point and the PCM signals in the post-splice point near the splice point are used with the correction means to fade-out the data in the pre-splice point and to fade-in the data in the post-splice point using cross fading so as to prevent the level jumping of the reproduced sound signals. It is unnecessary to vary a tape running speed and to use two kinds of clock generator circuits for double write-in and the cost can be remarkably reduced.

We claim:

1. A PCM record reproducer which comprises a coder circuit for forming PCM signals by adding error detection codes to data signals in a predetermined pattern prior to recording on a magnetic tape; a splice detection circuit for determining a splice point of the magnetic tape by finding inconsistency between the detected error detection codes depending upon evaluation of said PCM signals read-out from said magnetic tape in which said PCM signals are recorded; and an editing circuit for editing said PCM signals when the splice point is determined by said splice detector circuit; wherein said coder circuit has a structure for adding two or more kinds of error detection codes to said data signals; and said splice detector circuit has a structure for determining the splice point of said magnetic tape, at a time indicated by at least one inconsistency of the detected result of two or more kinds of said error detection codes.

2. A PCM record reproducer which comprises a coder circuit for forming frames by adding to respective PCM data signals respective error detection codes to produce PCM signals allotted into multitracks and recorded on a magnetic tape; first means for delaying the PCM signals allotted to different tracks for a predetermined number of frames; a detector circuit for detecting each error for each track from the magnetic tape in which the PCM signals are delayed for a predetermined number of frames in different tracks; second means for delaying by a predetermined number of frames the PCM signals reproduced from said magnetic tape such that the number of frame delays produced by said first and second delay means in each track is equal; a splice detector circuit for determining a splice point of said magnetic tape by finding errors in frames of more than a predetermined number of tracks or all the tracks upon a detection by said detector circuit; and an editing circuit for editing the PCM signals when the splice point is detected by said splice detector circuit; wherein said editing circuit comprises a circuit for forming a first PCM signal train corresponding to sound signals for a period in the presplice point based on PCM signals occurring prior to the splice point detected by said splice detector circuit; a circuit for forming a second PCM signal train corresponding to sound signals for a period after the detected splice point; a significance circuit for gradually decreasing the sound level corresponding to the first PCM signal train from 1 to 0 over time; a significance circuit for gradually increasing the sound level corresponding to the second PCM signal train from 0 to 1 over time; and an adder circuit for summing outputs of said two significance circuits.

3. A PCM record reproducer which comprises a coder circuit for forming PCM signals by adding error detection codes to data signals in a predetermined pattern prior to recording on a magnetic tape; a splice detection circuit for determining a splice point of the magnetic tape by finding inconsistency between the detected error detection codes depending upon evaluation of said PCM signals read-out from said magnetic type in which said PCM signals are recorded; and an editing circuit for editing said PCM signals when the spllice point is determined by said splice detector circuit;
wherein said editing circuit comprises a circuit for forming a first PCM signal train corresponding to sound signals for a period in the presplice point based on PCM signals occurring prior to the splice point detected by said splice detector circuit; a circuit for forming a second PCM signal train corresponding to sound signals for a perior after the detected splice point; a significance circuit for gradually decreasing the sound level corresponding to the first PCM signal train from 1 to 0 over time; a significance circuit for gradually increasing the sound level corresponding to the second PCM signal train from 0 to 1 over time; and an adder circuit for summing outputs of said two significance circuits.

4. The PCM record reproducer for reproducing PCM signals recorded in a magnetic tape by allotting the PCM signals into multi-tracks to form block codes by adding error detection codes in the track direction and in the tape running direction and recording the signals in different delay for different tracks, according to claim 1 which comprises a splice detector circuit for determining a splice point of said magnetic tape by finding at least one inconsistency between the detected error codes in the track direction and the detected error codes in the tape running direction.

5. The PCM record reproducer for reproducing PCM signals recorded in a magnetic tape according to claim 5 which comprises a first splice detector circuit for outputting a first splice detection signal by finding errors in frames of more than a predetermined number of tracks; a delay circuit for delaying signals to be the same total number of delayed frames in all the tracks in the recording as that in the reproducing; a second splice detector circuit for outputting a second splice detection signal by finding inconsistency between the detected error codes in the track directions and the detected error codes in the tape running direction in each block unit after the delay; and an editing circuit for editing only when said second splice detection signal is output during a predetermined period after outputting said first splice detection signal.

6. The PCM record reproducer according to claim 5 wherein said editing circuit comprises a circuit for forming a first PCM signal train corresponding to sound signals for a period prior to the splice point detected by said splice detector circuit; a circuit for forming a second PCM signal train corresponding to sound signals for a period after the splice-point detection; a significance circuit for gradually decreasing the sound level corresponding to the first PCM signal train from 1 to 0 over time; a significance circuit for gradually increasing the sound level corresponding to the second PCM signal train from 0 to 1 over time; and an adder circuit for summing outputs of said two significance circuits.

* * * * *